Figure 1:
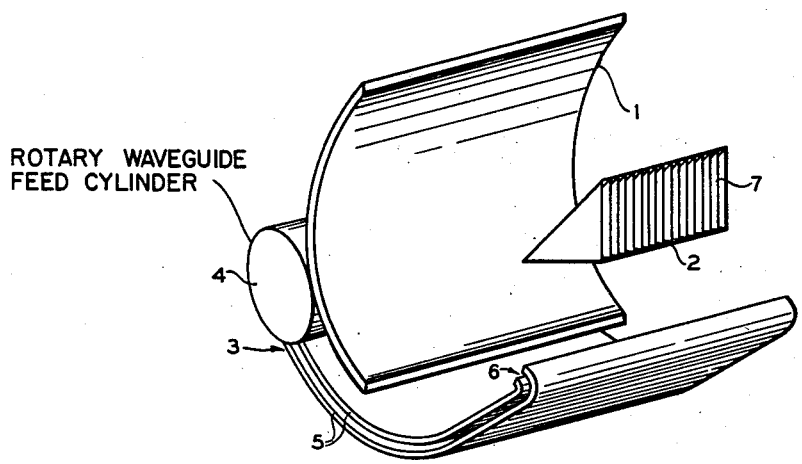

Nov. 27, 1951  J. RUZE ET AL  2,576,146
RAPID SCANNING SYSTEM
Filed Aug. 17, 1948

INVENTORS.
JOHN RUZE
ORVILLE C. WOODYARD
BY Harry M. Saragovitz
Attorney

Patented Nov. 27, 1951

2,576,146

UNITED STATES PATENT OFFICE 2,576,146

RAPID SCANNING SYSTEM

John Ruze, Cambridge, Mass., and Orville C. Woodyard, Neptune, N. J., assignors to the United States of America as represented by the Secretary of War Application August 17, 1948, Serial No. 44,757

5 Claims. (Cl. 250—33.63)

(Granted under the act of March 3, 1883, as amended April 30, 1928; 370 O. G. 757)

The invention described in the following specification and claims may be manufactured and used by or for the Government for governmental purposes, without the payment to us of any royalty thereon.

This invention relates to new and improved methods and means for directionally radiating electromagnetic wave energy. More particularly, it relates to a means for rapidly scanning a given area with a pencil beam in a television type scan.

In certain radar applications it is highly desirable to use a pencil beam to scan a given area both in azimuth and in elevation. The scanning rate required in this television type scan is generally so great that it precludes mechanical motion of the antenna as a whole, or even of some part of the radiating portion of the antenna. A series of electrical scanners have been developed wherein electrical changes, involving no mechanical motion of radiating antenna parts, affect the wave propagation by producing a linear phase change across the aperture of the antenna. An electrical scanner may be defined as one wherein the beam is moved, not by a motion of the antenna as a whole, but rather by relatively subtle motions of the feed or other parts of the antenna. One type of electrical scanner is the rolled parallel-plate scanning antenna which has a single rotary wave guide feed and is capable of rapid scan in one plane. A description of one example of this type of antenna appears in sections 9.15 and 9.16 of "Radar Systems Engineering," edited by Louis H. Ridenour, and published by McGraw-Hill Book Company, Inc., in 1947. In addition to a rapid scan, this antenna provides a beam position independent of frequency.

A major disadvantage in the use of rolled parallel-plate scanners is that scanning takes place in only one plane. To overcome this disadvantage, we have developed a system, using an electrical scanner, which scans in two coordinates.

It is known that the action of a glass prism upon a light ray is duplicated in the action of a metal plate prism upon electromagnetic energy. A metal plate prism comprising a row of parallel conducting plates constitutes a refractive medium having an index of refraction less than unity. The angle of deviation of a prism is a function of its refracting angle, its index of refraction, and the angle of incidence of the waves it affects. Scanning in one plane can be produced by varying any of these quantities. Since the index of refraction is a function of frequency, the amount by which a beam of electromagnetic energy will be bent or refracted depends upon its frequency or wave length. Therefore, scanning in one plane takes place with variation in the frequency of electromagnetic energy fed into a metal plate prism. By combining in a single antenna a rolled parallel-plate scanner and a prism consisting of a series of wave guide plates, electrical scanning in two planes results and a television type scan is achieved.

A fundamental requirement of an operative television-type scanning system is that the scanning rate in one coordinate be many times the scanning rate in the other coordinate. Most of the two dimensional scanning systems currently in use are limited in their scanning speed by this required differential. In the system that we have invented, it is possible to achieve scanning in one coordinate at a rate in the audio-frequency range for each single scan in a second coordinate. This is due to the fact that the radio-frequency output of the parallel-plate scanner is frequency modulated. Therefore, the faster scan is not limited by any mechanical considerations but is purely electronic.

An object of the invention is, therefore, to produce a television type scan by electrical means.

A further object is to produce scanning in two coordinates through the use of a frequency insensitive scanner and a frequency sensitive wave guide prism.

Another object is to produce a television scan wherein the scanning rate in one coordinate is many thousands of times the scanning rate in the second coordinate.

A further object of this invention is to produce a scanning process that is very unsusceptible to jamming or interference. This result follows from the fact that the scanning process is accomplished in part by varying the frequency of the system. An interfering agent would be forced to provide jamming signals over the entire frequency scan. A single frequency jammer or one operating over a narrow frequency range would blanket the system only in a narrow vertical angular region. If a jammed region is important, this jammed region may be covered by another frequency by tilting the entire system.

Figure 2:
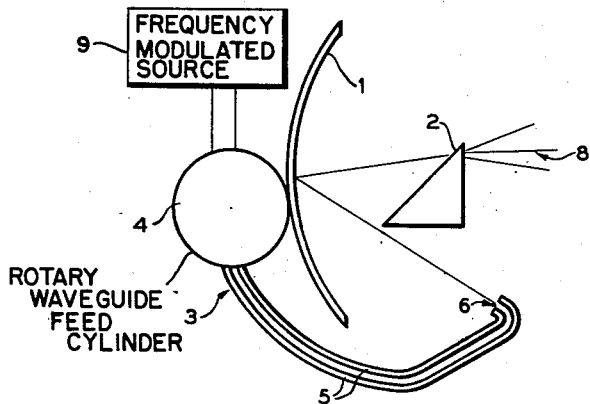

Figures 1 and 2 show different views of applicant's device.

Referring now to Figs. 1 and 2, the antenna comprises a reflector 1, a prism 2 and a rolled parallel-plate scanner 3. The reflector 1 is a truncated parabolic cylinder formed by cutting a parabolic cylinder by a plane parallel to and slightly offset from a plane including the focal axis and the focal line of said reflector. The prism 2 is a conventional metallic prism comprising a plurality of vertically stacked waveguide sections. The scanner 3 comprises an internal feed cylinder 4, parallel plates 5 and line aperture 6. Line aperture 6 is positioned along the focal line of reflector 1. Scanner 3 is fed by a frequency modulated source 9 of microwave energy.

A distinctive feature of the rolled parallel-plate type of scanner, as is well known in the art, is that the parallel conducting plates are rolled in various manners to obtain a focal path which is a complete ring. A single feed horn is continuously rotated within this ring to successively feed energy to every portion of the ring. The resulting beam motion consists of a one way linear scan at a cyclic rate of feed rotation. In scanner 3, the rotary wave guide feed horn (not shown) is positioned within internal feed cylinder 4. As the feed horn is rotated, energy is fed between the parallel conducting plates 5. Line aperture 6, between the parallel plates, radiates the energy toward reflector 1. The aperture faces the center of the reflecting surface to eliminate radiation of energy beyond the edges of the reflector. Due to the action of scanner 3, electromagnetic energy radiating from horizontally positioned line aperture 6 sweeps back and forth, in a horizontal plane, along the reflecting surface of reflector 1. This produces an azimuth scan at a rate determined by the speed of rotation of the feed horn. Since the rolled parallel-plate type of scanner is insensitive to the frequency changes, the radio-frequency energy fed to it can be frequency modulated without affecting the horizontal beam position.

Prism 2 is made up of a series of vertically stacked parallel conducting plates 7 to form wave guide sections that are selected to give desired phase velocity relationships. The prism, placed in the path of the beam of energy reflected from reflector 1, will cause a vertical deflection of the reflected energy, said deflection being a function of the frequency of the radiation. This deflection is indicated by beams 8 of Fig. 2. Therefore, when rolled parallel-plate scanner 3 is fed by energy that is constantly changing in frequency, scanning will occur in two coordinates, namely, an azimuth scan resulting from action of the scanner in sweeping energy back and forth along reflector 1, and an elevation scan resulting from variation in phase velocity through prism 2 depending upon the frequency variation. The rate of the vertical scan will depend upon the modulating frequency used in the parallel-plate scanner.

For a wave guide prism, the angular dispersion about the point of minimum deviation is given by the formula $$\frac{d\theta}{d\lambda} = \frac{-2\frac{d\mu}{d\lambda}\sin\frac{A}{2}}{\left[1-\mu^2\sin^2\frac{A}{2}\right]^{\frac{1}{2}}}$$

where $\theta$ = the angular dispersion,
$\lambda$ = the wave length in free space,
$A$ = the angle of the prism,
$\mu$ = the index of refraction = $\frac{V \text{ air}}{V \text{ guide}}$ $V$ air = velocity of propagation in free space, and
$V$ guide = velocity of propagation in a wave guide section of the prism.

If we choose a 1.25 centimeter wave guide having an index of refraction equal to 0.60 for the wavelength of 1.25 centimeters and use a 45 degree prism, the following relationships are apparent:

From a curve on page 72 in "Microwave Transmission Design Data," published by Sperry Gyroscope Company, Inc., 1944, where $\lambda$ = wavelength in free space,
$\lambda_c$ = wavelength at cut off in an air-filled wave guide,
$\lambda_g$ = wavelength in the wave guide, and where $$\frac{\lambda}{\lambda_g} = 0.6$$

$$\frac{\lambda}{\lambda_c} = 0.795$$

$$\lambda_c = \frac{1.25}{0.795 \times 2.54} = 0.619''$$

Let $\lambda$ change to 1.27 cm., then $$\frac{\lambda}{\lambda_c} = \frac{1.27}{2.54 \times .619} = 0.808$$

From the same curve, where $$\frac{\lambda}{\lambda_c} = 0.808$$

$$\frac{\lambda}{\lambda_g} = 0.583$$

$\therefore \Delta\mu = 0.600 - 0.583 = 0.017$ for $\Delta\lambda = -0.02$ cm.

$$\frac{d\mu}{d\lambda} = \frac{0.017}{-0.02} = -0.85$$

then $$\frac{d\theta}{d\lambda} = \frac{(-2) \times (-0.85) \times 0.383}{[1-(0.600^2 \times 0.383^2)]^{\frac{1}{2}}} = 0.669 \text{ rad./cm.}$$

$$\frac{d\theta}{d\lambda} = \frac{0.669 \times 57.3}{100} = 0.384 \text{ degree}/\frac{1}{100}\text{cm.}$$

For 5 degree beam shift, $$\Delta\lambda = 5/0.384 = 0.13 \text{ cm.}$$

This would represent a variation in wave length from 1.18 centimeters to 1.31 centimeters.

It should be pointed out that this figure is not the best obtainable. At least two obvious things may be done to increase $$\frac{d\theta}{d\lambda}$$

namely, choose $\mu$ at a value for which $$\frac{d\mu}{d\lambda}$$

is greater and increase A. Increasing A to 60° would increase $$\frac{d\theta}{d\lambda}$$

by about 20%.

The above-described structure is only one illustrative embodiment of the many possible embodiments of the invention. Other embodiments within the spirit and scope of our invention would comprise the use of other types of prisms. For the metal plate prism above described, there can be substituted a wire curtain prism, a dielectric prism, or an artificial dielectric prism. With the latter prism, one can readily reach the point of anomalous dispersion, at which point the index of refraction changes rapidly with frequency. The artificial dielectric prism can be so constructed that the region of anomalous dispersion coincides with the frequency of the radio-frequency energy radiated by the parallel-plate scanner. Under these conditions the prism would be extremely sensitive to variations in the modulating frequency. It is obvious that other arrangements within the spirit and scope of the invention will readily occur to those skilled in the art, and that the invention is applicable to electromagnetic energy, sonic energy, etc. The scope of the invention is defined in the following claims.

What is claimed is:

1. A scanning system comprising means for producing frequency-modulated electromagnetic energy, means adjacent said producing means for causing said energy to scan in a first plane independently of the frequency, and a stationary prism adjacent said scanning means, said prism having an index of refraction variable with frequency and being oriented to cause said energy to scan additionally in a second coordinate in accordance with the frequency.

2. A scanning system according to claim 1 in which said prism comprises a plurality of conducting plates mounted parallel to one another to form wave guides for said energy.

3. A scanning system comprising means for producing frequency-modulated electromagnetic energy, directive means, means adjacent said producing means for causing said energy to sweep in a first coordinate across said directive means independently of the frequency, and a stationary prism in the path of energy from said directive means, said prism having an index of refraction variable with frequency and being oriented with respect to said directive means to cause said energy to scan additionally in a second coordinate in accordance with the frequency.

4. A scanning system comprising means for producing frequency-modulated electromagnetic energy, a reflector, means adjacent said producing means for causing said energy to sweep in a first coordinate across said reflector independently of the frequency, and a stationary prism in the path of energy from said reflector, said prism including a plurality of triangular-shaped conducting plates mounted parallel to one another to form a plurality of wave guide paths for said energy, said prism having an index of refraction variable with frequency, said prism being oriented with respect to said reflector to cause said frequency-modulated energy to scan additionally in a second coordinate.

5. An antenna scanning system comprising means for causing a frequency-modulated beam of electromagnetic energy to scan along a first coordinate independently of the frequency of said energy, and a stationary prism adjacent said scanning means, said prism having an index of refraction which is variable with frequency and being oriented to cause said energy to scan additionally in a second coordinate in accordance with the frequency of said energy.

JOHN RUZE.
ORVILLE C. WOODYARD.

REFERENCES CITED

The following references are of record in the file of this patent:

UNITED STATES PATENTS

| Number | Name | Date |
|---|---|---|
| 2,085,406 | Zworykin | June 29, 1937 |
| 2,142,648 | Linder | Jan. 3, 1939 |
| 2,408,435 | Mason | Oct. 1, 1946 |
| 2,435,988 | Varian | Feb. 17, 1948 |
| 2,442,951 | Iams | June 8, 1948 |
| 2,447,768 | Mueller | Aug. 24, 1948 |
| 2,464,276 | Varian | Mar. 15, 1949 |

OTHER REFERENCES

"Metal Lens Antenna," W. E. Kock, Proc. IRE, vol. 34, pp. 828 to 836, November 1946.